(12) United States Patent
Fredriksen et al.

(10) Patent No.: US 6,315,691 B1
(45) Date of Patent: Nov. 13, 2001

(54) TOOTHED SELECTOR CLUTCH

(75) Inventors: Nils Fredriksen, Harsewinkel; Detlev Brockschmidt, Herford; Robert Obermeier-Hartmann, Bueren, all of (DE)

(73) Assignee: CLAAS Industrietechnik GmbH, Paderborn (DE)

( * ) Notice: Subject to any disclaimer, the term of this patent is extended or adjusted under 35 U.S.C. 154(b) by 0 days.

(21) Appl. No.: 09/579,459

(22) Filed: May 26, 2000

(30) Foreign Application Priority Data

May 28, 1999 (DE) ............................................. 199 24 512

(51) Int. Cl.[7] .................................................. F16H 47/04
(52) U.S. Cl. ........................................... 475/72; 192/87.17
(58) Field of Search ........................... 475/72; 192/87.17, 192/113–33, 48–91

(56) References Cited

U.S. PATENT DOCUMENTS

| | | | |
|---|---|---|---|
| 3,424,285 | * 1/1969 | McRay | 192/87.17 |
| 5,052,986 | 10/1991 | Jarchow et al. | 475/76 |

FOREIGN PATENT DOCUMENTS

| | | |
|---|---|---|
| 39 43 770 | 8/1989 | (DE) . |
| 39 03 877 | 9/1990 | (DE) . |
| 40 38 170 | 6/1992 | (DE) . |

* cited by examiner

Primary Examiner—Dirk Wright
(74) Attorney, Agent, or Firm—Husch & Eppenberger, LLC; Robert E. Muir

(57) ABSTRACT

A toothed selector clutch is provided to operate in a hydrostatic/mechanical, split-torque power-shift transmission comprising a four-shaft epicyclic-gearwheel transmission and an infinitely variable hydrostatic transmission arranged in parallel. The selector clutch is associated with a particular gearwheel stage and is operated to select a particular gear. Gear changes take place at synchronous speeds without loading the engaging gear during the change and without interruption of the transmission of torque from the rotating shaft to the gear being disengaged. The toothed selector clutch is a coaxial double differential clutch with a clutch carrier that is arranged in a rotationally and axially fixed manner on a clutch shaft. A double piston, which can be subjected to a pressure medium on both sides, is provided as a shift bridge and is operatively connected to the clutch carrier by toothing thereby permitting torque transmission and axial displacement. The shift bridge carries shift toothing on each of its axially opposite ends and is acted upon from two separately controllable pressure spaces. When the shift bridge is subjected to pressure from both ends simultaneously, it remains or moves into its neutral, central position. Engagement of one of the two gears associated with the clutch may be accomplished depressurizing the pressure space assigned to the other gear causing the shift bridge to move axially and engage the intended gear.

19 Claims, 6 Drawing Sheets

TOOTHED SELECTOR CLUTCH

BACKGROUND OF THE INVENTION

The invention relates to a toothed selector clutch in a hydrostatic/mechanical, split-torque power-shift transmission. The transmission includes both a four-shaft epicyclic-gearwheel transmission and an infinitely variable hydrostatic transmission arranged in parallel. The power shift transmission includes a plurality of gearwheel stages each with an associated toothed selector clutch to thereby provide a plurality of gears. The selector clutch is operated to engage a gear within its associated stage. The hydrostatic transmission allows for an infinite variation of the transmission ratio of the overall hydrostatic/mechanical transmission.

German Patent No. 39 03 877 C1 discloses an infinitely variable, hydrostatic/mechanical power-shift transmission with toothed selector clutches, and is hereby incorporated by reference herein.

SUMMARY OF THE INVENTION

It is an object of the present invention to provide an improved selector clutch for effecting gear changes and, in particular, to provide a clutch that is compact in construction and operates reliably. It is another object of the present invention to provide a selector clutch that can effect gear changes at synchronous speeds in a load-free manner and without interruption to the tractive effort of the transmission.

In accomplishing the foregoing objects, there has been provided according to one embodiment of the present invention a toothed selector clutch in a hydrostatic/mechanical, split-torque power shift transmission having a four-shaft epicyclic-gearwheel transmission and an infinitely variable hydrostatic transmission arranged in parallel. The transmission includes downstream gearwheel stages each with associated toothed selector clutches thereby providing a plurality of gears. The hydrostatic transmission provides an infinitely variable transmission ratio for the hydrostatic/mechanical transmission. The toothed selector clutch includes a coaxial double differential clutch comprising: a clutch carrier mounted on a rotatable shaft; a shift bridge operatively connected to the clutch carrier by radial toothing thereby providing for the transmission of torque between the clutch carrier and the shift bridge and for the axial displacement of the shift bridge. The shift bridge is subjected to a pressure medium on axially opposite ends and includes shift toothing on each of the axially opposite ends. The clutch includes a pair of separately controllable pressure spaces internal to the shift bridge for applying pressure to the opposite ends of the shift bridge, each of the pressure spaces being capable of being subjected to pressure simultaneously to place the shift bridge in a neutral, central position. Each of the pressure spaces are capable of being depressurized individually so that the shift toothing at the end of the shift bridge adjacent the pressurized pressure space engages an adjacent gear at a synchronous speed without transferring load from the shaft to the gear being engaged and without interruption to the transmission of torque from the shaft to an engaged gear designated to be disengaged.

Preferably the clutch carrier includes a guide portion projecting between the two pressure spaces and two annular differential pistons which are situated axially opposite one another. Each of the differential pistons projects into one of the pair of pressure spaces and is configured to be supported axially against the clutch carrier only when shift bridge is in the neutral, central position so that when the shift bridge is displaced axially away from the neutral position into a shift position one of the annular differential pistons is displaced by a drive feature of the shift bridge, preferably toothing, into the adjacent pressure space. The clutch carrier may include a hole for guiding lubricating oil to the region of the drive feature.

The clutch is preferably arranged so that when the shift bridge is in the shift position, the displaced one of the annular differential pistons is configured to rest against an interior axial facing surface of the shift bridge. In addition, a pressurized-oil feed passing through the shaft and a rotating joint may be provided for each of the pressure spaces. The pressure of each of the pressure spaces may be controlled by a solenoid valve located upstream of the associated rotating joint. The shift bridge may include a bleed hole, extending between an internal area between the pair of annular differential pistons and an area external to the shift bridge to relieve pressure in the pressure spaces.

According to another embodiment the clutch may comprise a clutch carrier mounted to a casing; a shift bridge including shift toothing mounted on each of its axially opposite ends. The shift bridge is connected to a rotatable shaft by radial toothing thereby allowing torque transmission from the shaft to the shift bridge. The clutch further includes a double piston mounted in the clutch carrier. The shift bridge is also connected kinematically by a ball bearing to the double piston. The clutch further includes a pair of pressure spaces contained in within the clutch carrier. The double piston is capable of being displaced axially between the pressure spaces and the pressure within each of the pressure spaces is capable of being controlled separately so that when the two pressure spaces are simultaneously pressurized the double piston is positioned in a neutral, central position. Each of the pressure spaces is capable of being depressurized individually so that when one of the pressure spaces is depressurized the double piston and the shift bridge move axially into a shift position so that the shift toothing at the end of the shift bridge adjacent the other pressurized pressure space engages an adjacent gear at a synchronous speed without transferring load from the shaft to the gear being engaged and without interruption to the transmission of torque from the shaft to an engaged gear designated to be disengaged.

Preferably, the toothed selector clutch may further include two annular differential pistons situated axially opposite one another, each piston having an axial face adjacent one of the two pressure spaces, the differential pistons being supported axially against the clutch carrier only when the double piston is in the neutral, central position the differential pistons being configured so that when the double piston is displaced into the shift position of the shift bridge, one of the annular differential pistons is displaced by an associated drive feature of the double piston into the adjacent pressure space. The double piston may also be operatively connected to a displacement sensor.

In its generic aspects, the present invention provides a toothed selector clutch in a hydrostatic/mechanical, split-torque power-shift transmission having a four-shaft epicyclic-gearwheel transmission and an infinitely variable hydrostatic transmission arranged in parallel. The transmission includes downstream gearwheel stages with associated toothed selector clutches thereby providing a plurality of gears. The hydrostatic transmission provides an infinitely variable transmission ratio for the hydrostatic/mechanical transmission. The toothed selector clutch includes a coaxial double differential clutch comprising a shift bridge including shift toothing mounted on each of its axially opposite ends. The shift bridge is operatively connected to a rotatable transmission component by radial toothing thereby allowing torque transmission from the rotating component to the shift bridge and axial movement of the shift bridge relative to the rotating component. The clutch includes a pair of separately controllable pressure spaces, the pressure within each of the pressure spaces capable of being controlled separately so that when the two pressure spaces are simultaneously pressurized the shift bridge is positioned in a neutral, central position. Each of the pressure spaces is capable of being depressurized individually so that when one of the pressure spaces is depressurized the shift bridge moves axially into a shift position so that the shift toothing at one end of the shift bridge engages an adjacent gear at a synchronous speed without transferring load from a rotating clutch shaft to the gear being engaged and without interruption to the transmission of torque from the clutch shaft an engaged gear designated to be disengaged. The rotatable transmission component may be the clutch shaft or a clutch carrier mounted to the clutch shaft.

According to a further aspect of the present invention a hydrostatic/mechanical, split-torque power shift transmission is provided.

Further objects, features and advantages the present invention will become apparent from the detailed description of the invention that follows. It is to be understood that both the foregoing general description and the following detailed description are exemplary and explanatory only and are not restrictive of the invention, as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawing.

FIG. 1 is a schematic line drawing representing a four-shaft epicyclic transmission;

FIG. 1A is a graph showing the variation in the speed of the output shaft relative to the input shaft;

FIG. 2 is a cross-sectional view through a coaxial double differential clutch of the present invention;

FIG. 3 is a cross-sectional view of the clutch of FIG. 2 with a valve control system for feeding pressurized oil to the clutch;

FIG. 4 is a cross-sectional view of a second embodiment of a selector clutch according to the present invention;

FIG. 5 shows a cross-sectional view of a third embodiment of a selector clutch according to the present invention; and FIG. 6 shows a cross-sectional view of a fourth embodiment of a selector clutch according to the present invention.

DETAILED DESCRIPTION OF PREFERRED EMBODIMENTS

Figure 1:
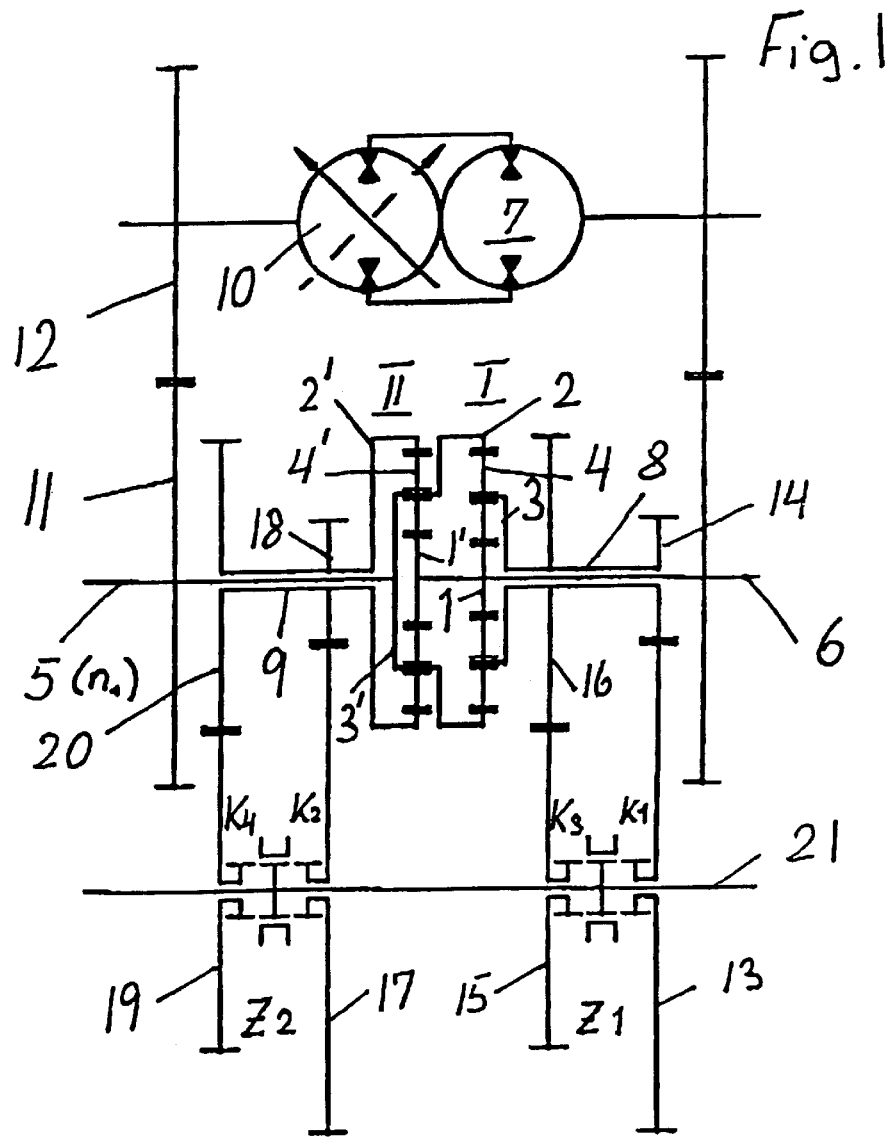
FIGS. 1 and 1A show the prior art and FIGS. 2 to 6 show a number of embodiments of the invention serving as examples. In the drawings.

The object on which the invention is based is to develop an embodiment which is compact in construction and operates reliably for the toothed selector clutch described at the outset.

Referring to the toothed selector clutch described above, this object is achieved according to the invention by providing a toothed selector clutch designed as a coaxial double differential clutch which has a clutch carrier which is arranged in a rotationally and axially fixed manner on a rotating transmission component, preferably a clutch shaft. A double piston is mounted on the clutch shaft and can be subjected to a pressure medium on both sides. The double piston is designed as a shift bridge and is connected operatively to the clutch carrier by toothing which allows torque transmission and axial displacement. The shift bridge carries shift toothing on each of its axially opposite ends and can be acted upon from two separately controllable pressure spaces which, when subjected to pressure simultaneously, hold the shift bridge in its neutral, central position or displace it into this central position, while the engagement of one of the two gears assigned to the shift toothings is performed by depressurization of the pressure space assigned to the other gear.

At the same time, it is also preferred for the clutch carrier to project a guide portion between the two pressure spaces surrounded by the shift bridge. The guide portion carries two annular differential pistons, which are situated axially opposite one another, each projecting into one of the two pressure spaces. The differential pistons are supported axially against the clutch carrier only in the neutral, central position of the shift bridge, while, when the shift bridge is displaced into a shift position, an annular differential piston is displaced by an associated drive feature of the shift bridge into the associated pressure space.

To avoid power transmission to the clutch shaft via seals, it is preferred if, in the shift position of the shift bridge, the corresponding annular differential piston rests against that piston face of the shift bridge which faces it.

According to the invention, a modified embodiment can be distinguished by the fact that the shift bridge projects an annular, radially inward-projecting double piston of approximately T-shaped cross section into the interior of the clutch carrier surrounding the two pressure spaces and is assigned to two annular differential pistons which are situated axially opposite one another. Each differential piston projects into one of the two pressure spaces and is supported axially against the clutch carrier only in the neutral, central position of the shift bridge. When the shift bridge is displaced into a shift position, an annular differential piston is displaced by an associated drive feature of the shift bridge into the associated pressure space.

In the embodiments described above, it is preferred if a pressurized-oil feed through the clutch shaft in conjunction with a rotating joint is provided for each of the two pressure spaces, control preferably being exercised by means of NO (NORMALLY OPEN) 3/2-way solenoid valves arranged upstream of the rotating joint. When the valve is closed, this allows the pressure space thereby closed off to be emptied toward an oil tank. A corresponding valve circuit can also be found in German Patent No. 40 38 170 A1.

With regard to the the toothed selector clutch described above, the object underlying the invention is also achieved, in an alternative solution according to the invention, by providing a toothed selector clutch that is designed as a coaxial double differential clutch which has a shift bridge which bears respective shift toothing on its axially opposite ends. The shift bridge is connected rotationally by toothing which allows torque transmission and axial displacement to a rotating transmission component, preferably a clutch shaft, and is connected kinematically, by a ball bearing which transmits the required shifting force, to a double piston which is mounted in a clutch carrier. The double piston is arranged in a manner fixed relative to the casing, in such a way that it can be displaced axially between two pressure spaces which are surrounded by the clutch carrier. Each pressure space can be controlled separately from the casing side and, when simultaneously pressurized, hold the double piston in its neutral, central position or displace it into this central position, while the engagement of one of the two gears assigned to the shift toothings is performed by depressurization of the pressure space assigned to the other gear.

In all the embodiments, it is preferred if the angle of the shift toothing points away and is greater than or equal to the self-locking angle; in principle, however, it can also be zero or even less than or equal to the self-locking angle.

Figure 1A:
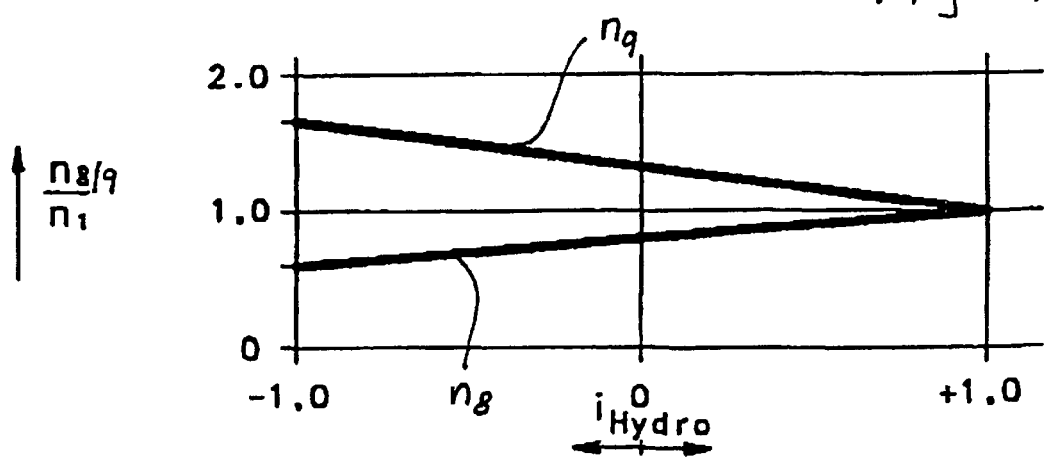

FIG. 1 discloses a typical four-shaft epicyclic transmission that includes an epicyclic stage I with a sun gear 1, an annulus 2 and a planet carrier 3 with planet gears 4 and an epicyclic stage II with a sun gear 1', an annulus 2' and a planet carrier 3' with planet gears 4'. The planet carrier 3' and the annulus 2 form an input shaft 5; the sun gears 1, 1' form a shaft 6 for the connection of a constant-volume positive displacement machine 7; the planet carrier 3 forms a slow-running coupler shaft 8; the annulus 2' forms a fast-running coupler shaft 9. A variable-volume positive displacement machine 10 is connected by gears 11, 12 to the input shaft 5. As shown in FIG. 1A, the coupler shafts 8, 9 operate so that, at a speed ratio of the positive displacement machines $n_7/n_{10}=+1$, the coupler shafts 8, 9 rotate at the same speed. When the hydrostatic transmission is adjusted in the direction $n_7/n_{10}-1$, the coupler shaft speeds change so that the coupler shaft 9 becomes steadily faster and the coupler shaft 8 becomes steadily slower.

A first double toothed selector clutch Z1 may connect the first gear $K_1$ having gearwheels 13, 14 or the third gear $K_3$ having gearwheels 15, 16 to an output shaft 21, and a second double toothed selector clutch Z2 may connect the second gear $K_2$ having gearwheels 17, 18 or the fourth gear $K_4$ having gearwheels 19, 20 to an output shaft 21.

The coupler shafts 8, 9 pass the power alternately from the input to the output. The first and the third gear are operatively connected to the coupler shaft 8 and the second and the fourth gear are operatively connected to the coupler shaft 9.

The speed of the two coupler shafts 8 and 9 may vary relative to the speed of the input shaft 5 as a function of the relative displacement volume of the variable positive displacement machine, as shown in FIG. 1A.

According to the present invention, a gear change is initiated at synchronous speeds of the new toothed clutch to be closed. The new or engaging clutch is engaged in a load-free condition (i.e. without the transmission of torque) while the old or disengaging toothed clutch remains engaged with its gears and transmitting power. The shift in load from the old clutch to the new clutch is performed by means of a controlled correction or change in volume of the control fluid in the hydrostatic transmission. At the end of this correction, the new clutch carries the load and the old clutch becomes unloaded and may be disengaged in a load-free condition.

Figure 2:
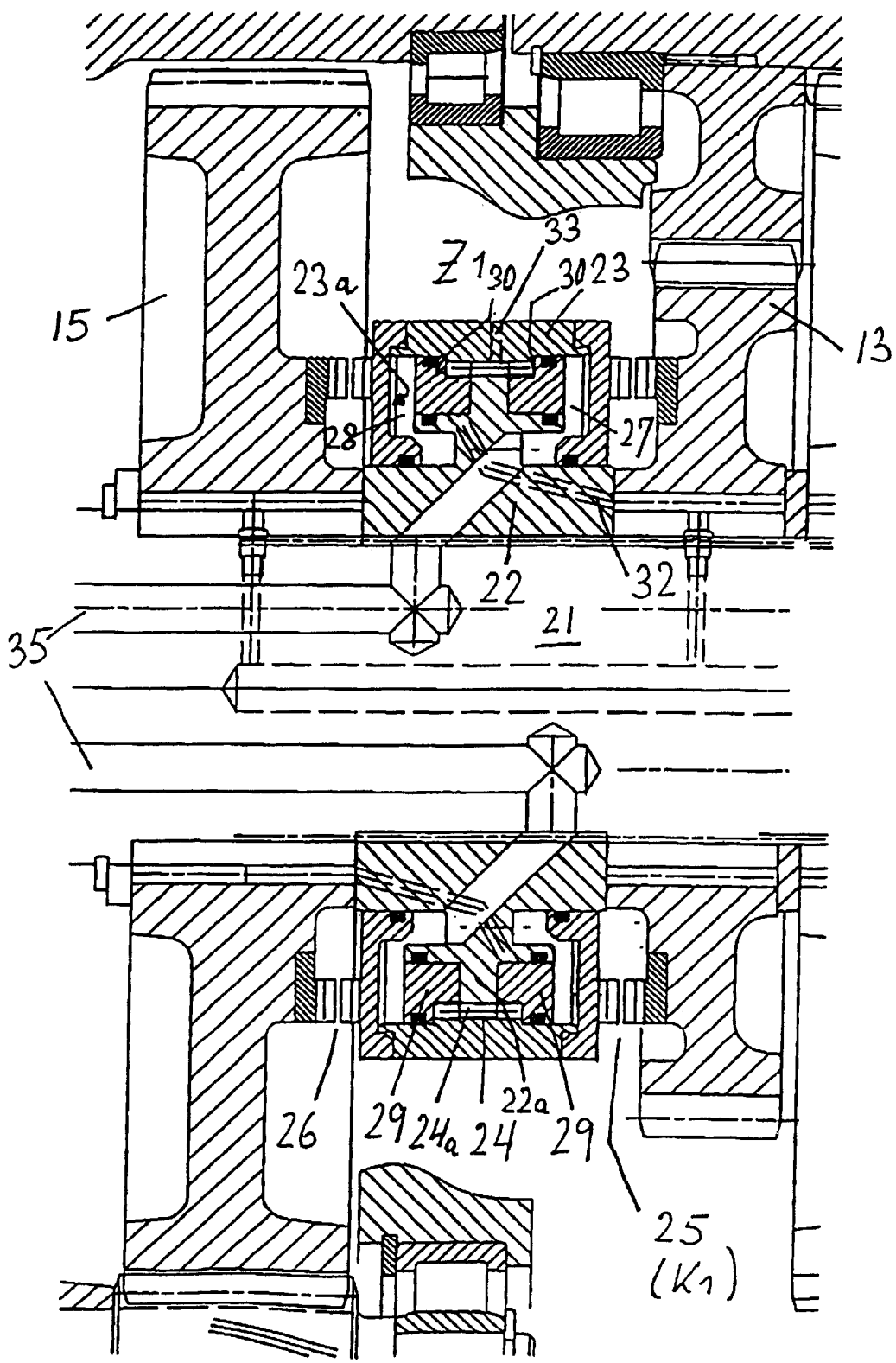

A preferred embodiment of the present invention includes a toothed selector clutch Z1, Z2 which may operate as a coaxial double differential clutch. As shown in FIG. 2, the clutch may include a clutch carrier 22 which is positioned in a rotationally and axially fixed manner on a clutch shaft (output shaft 21 in FIG. 1). A double piston 23 may be mounted to the clutch carrier 22. The double piston or shift bridge 23 may be subjected to a pressure source on both sides. The double piston 23 is operatively connected to the clutch carrier 22 by toothing 24 which permits torque transmission between the piston 23 and the clutch carrier 22. The piston or shift bridge 23 may be displaced in the axial direction and may include shift toothing 25, 26, mounted on axially opposite ends so that each tooth points outwardly or toward the adjacent gear. The position of the double piston 23 may be controlled by varying the pressure in two separately controllable pressure spaces 27, 28 located within the shift bridge 23. When the pressure spaces 27, 28 are pressurized simultaneously, the shift bridge 23 is held in its neutral, central position, as shown in FIG. 2. If the shift bridge 23 is not in the neutral, central position, the pressurized chambers may move the bridge toward the central position. The engagement of one of the two gears ($K_1$, $K_3$ or $K_2$, $K_4$) assigned to the shift toothings 25, 26 may be accomplished by depressurizing the pressure space 27, 28 assigned to the other one of the two gears.

In all the embodiments of the invention described herein, it is preferred that the angle of the shift toothing points away and is less than or equal to the self-locking angle. However, the angle of the shift toothing may also be zero or even greater than or equal to the self-locking angle.

The clutch carrier 22 may include a guide portion 22a that projects between the two pressure spaces 27, 28 to support two annular differential pistons 29. The pistons 29 are situated axially opposite one another and each project into one of the two pressure spaces 27, 28. The annular differential pistons 29 are supported axially by the clutch carrier 22 only while the shift bridge 23 is in the neutral, central position. When the shift bridge 23 is displaced into a shift position away from the central position, an annular differential piston 29 may be displaced by an associated drive feature 30 of the shift bridge 23 into the associated pressure space 27 or 28. The drive features 30 may include the ends of the internal toothing 24a of the shift bridge 23, as shown in FIG. 2. The size of the shift bridge 23 and of the pressure spaces 27, 28 is preferably selected so that the corresponding annular differential piston 29 rests against the associated piston face 23a when the shift piston shifts into a shift position away from the central position. To avoid power transmission to the clutch shaft via seals, it is expedient if, in the shift position of the shift bridge, the corresponding annular differential piston rests against that piston face of the shift bridge which faces it.

The clutch of the present invention may also include a lubricating-oil hole or passage 32 which passes through the clutch carrier 22 and ends in the region of the radially projecting toothing 24. A bleed hole or passage 33, which opens between the two annular differential pistons 29, may pass through the radially outer part of the shift bridge 23.

Figure 3:
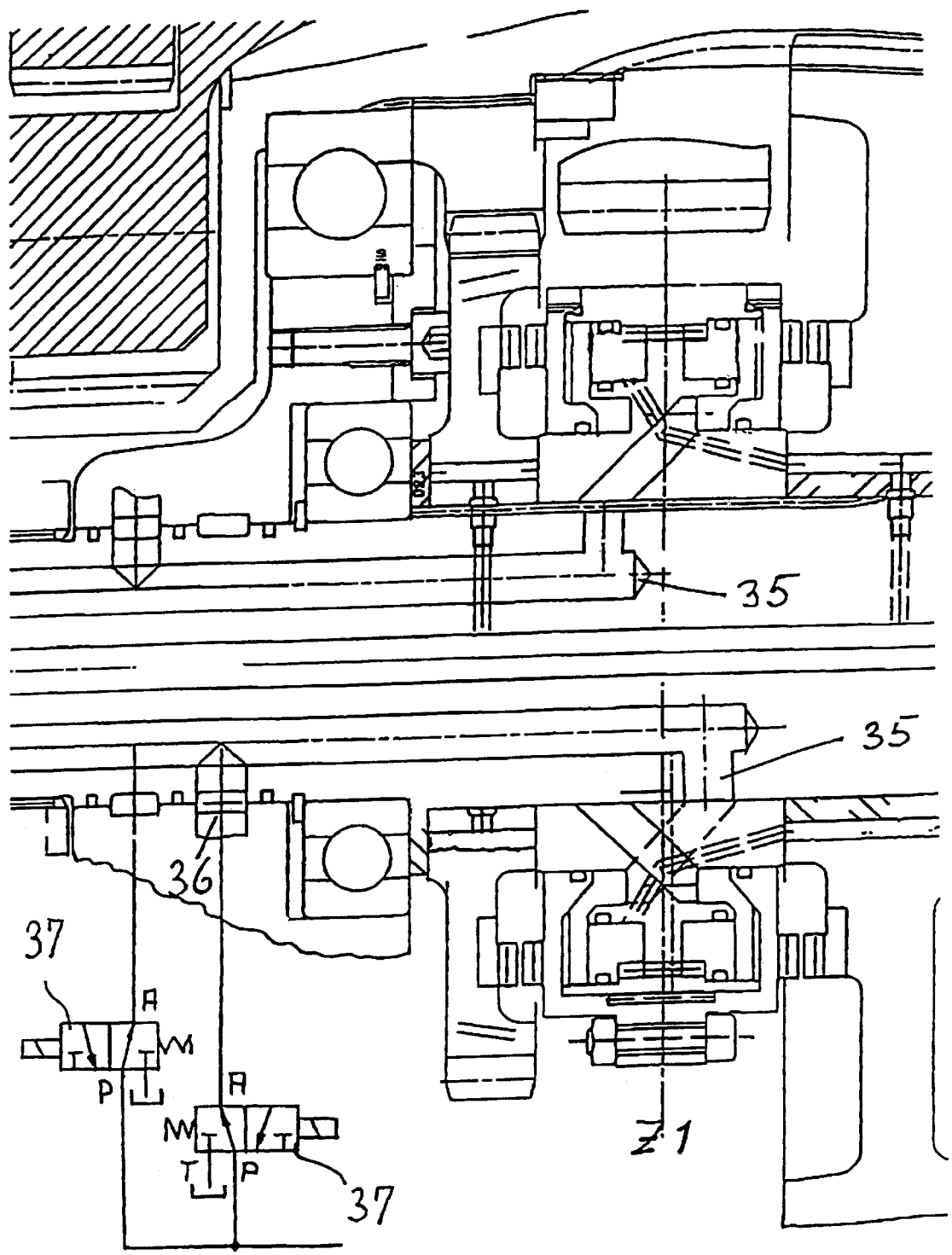

Preferably, in all of the embodiments of the invention described herein, each of the two pressure spaces 27, 28 may be connected to a pressurized-oil feed passage 35 which passes through the clutch shaft 21. The feed passage 35 may include a rotating joint 36. Pressure control of the pressure spaces is preferably controlled by the operation of NO (NORMALLY OPEN) 3/2-way solenoid valves 37 arranged upstream of the rotating joints 36, as shown in FIG. 3. When the solenoid valve is closed, the corresponding pressure space is thereby closed off to be emptied toward an oil tank. A representative valve circuit can also be found in German Patent DE 40 38 170 A1, which is hereby incorporated by reference herein.

Figure 4:
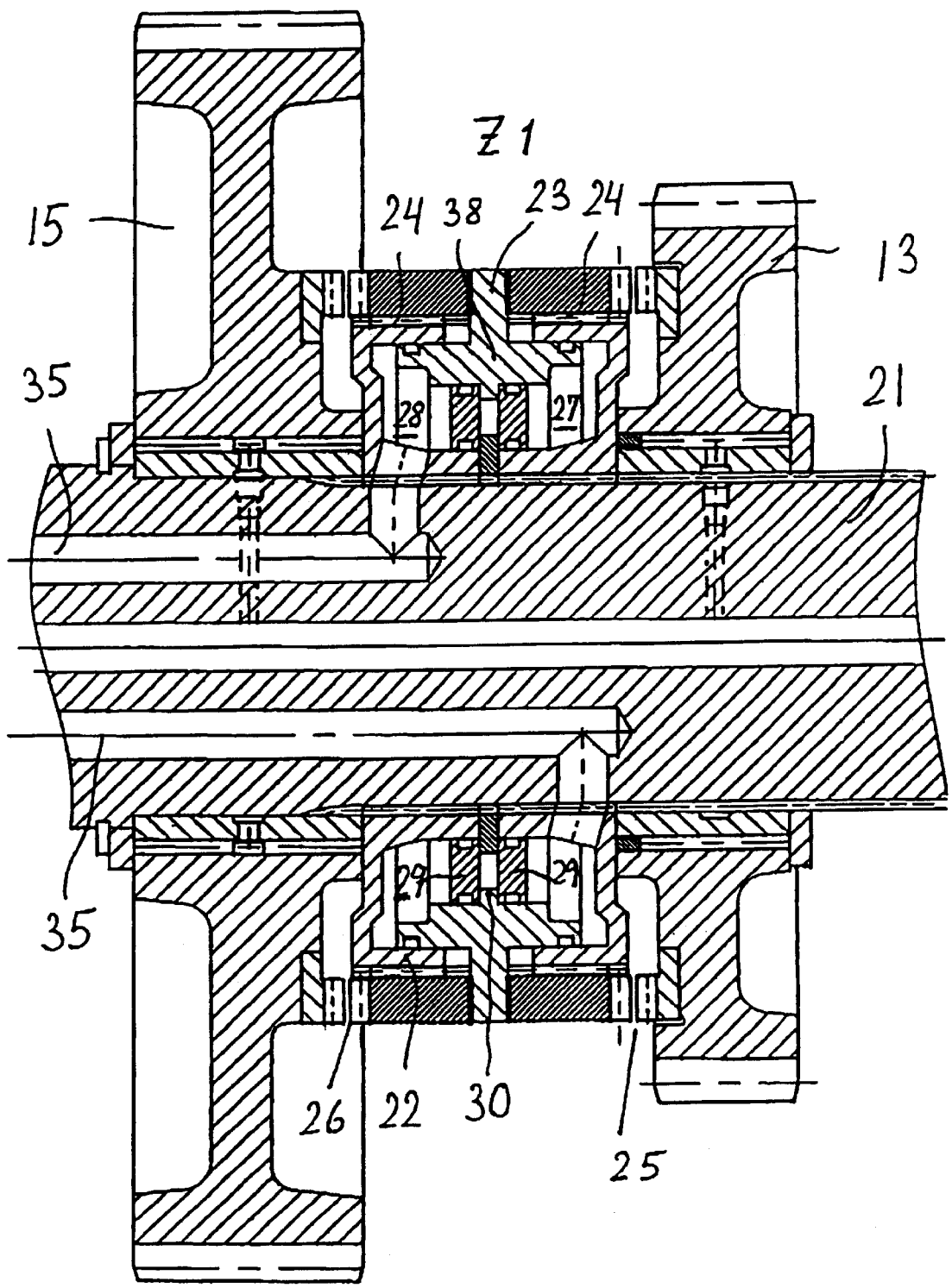

FIG. 4 discloses an alternative emodiment of a clutch according to the present invention. The shift bridge 23 may include an annular, radially inward-projecting double piston 38 having an approximately T-shaped cross section. The piston 38 may project into the interior of the clutch carrier 22 toward the two pressure spaces 27, 28. The clutch includes two annular differential pistons 29, which are situated axially opposite one another and each project into one of the two pressure spaces 27, 28. The annular differential pistons may be supported axially by the clutch carrier 22 when the shift bridge 23 is positioned in the neutral, central position, as shown in FIG. 4. When the shift bridge 23 is displaced axially into one shift position, an annular differential piston 29 is displaced by an associated drive feature 30 of the shift bridge 23 into the associated pressure space 27 or 28. The drive feature may be a radially projecting tooth.

Figure 5:
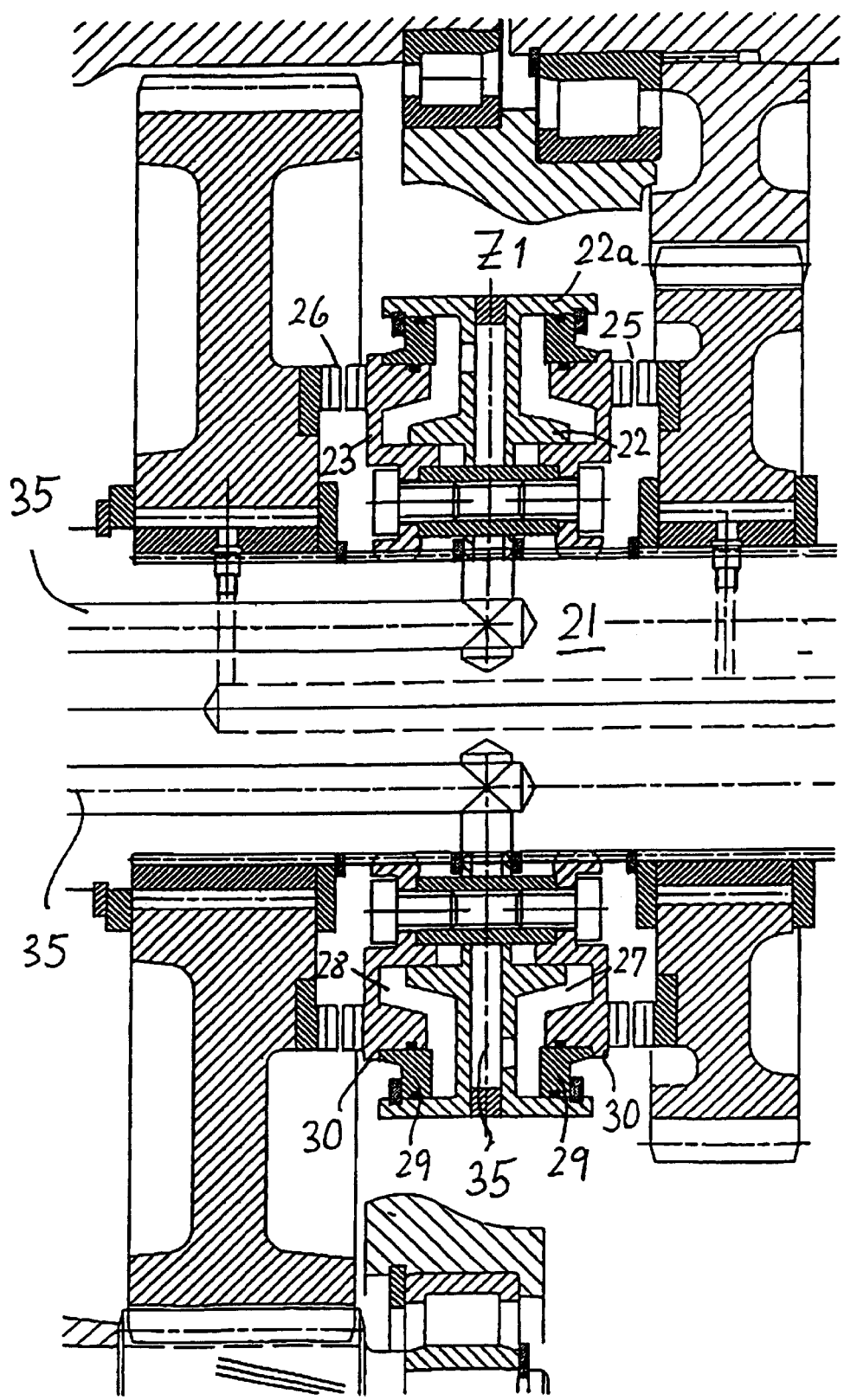

Another alternative embodiment of the present invention is disclosed in FIG. 5. The clutch generally corresponds to the clutch disclosed in FIG. 2. However, the clutch carrier 22, which is fixed to the shaft 21, extends radially outward through the shift bridge 23 to form an outer guide portion 22a. The guide portion 22a forms a guide for a pair of annular differential pistons 29 positioned on a radially outward annular surface of the shift bridge 23. As shown in FIG. 5, the pressurized-oil feed 35 passes through the central web of the clutch carrier 22 to the appropriate pressure space 27, 28.

Figure 6:
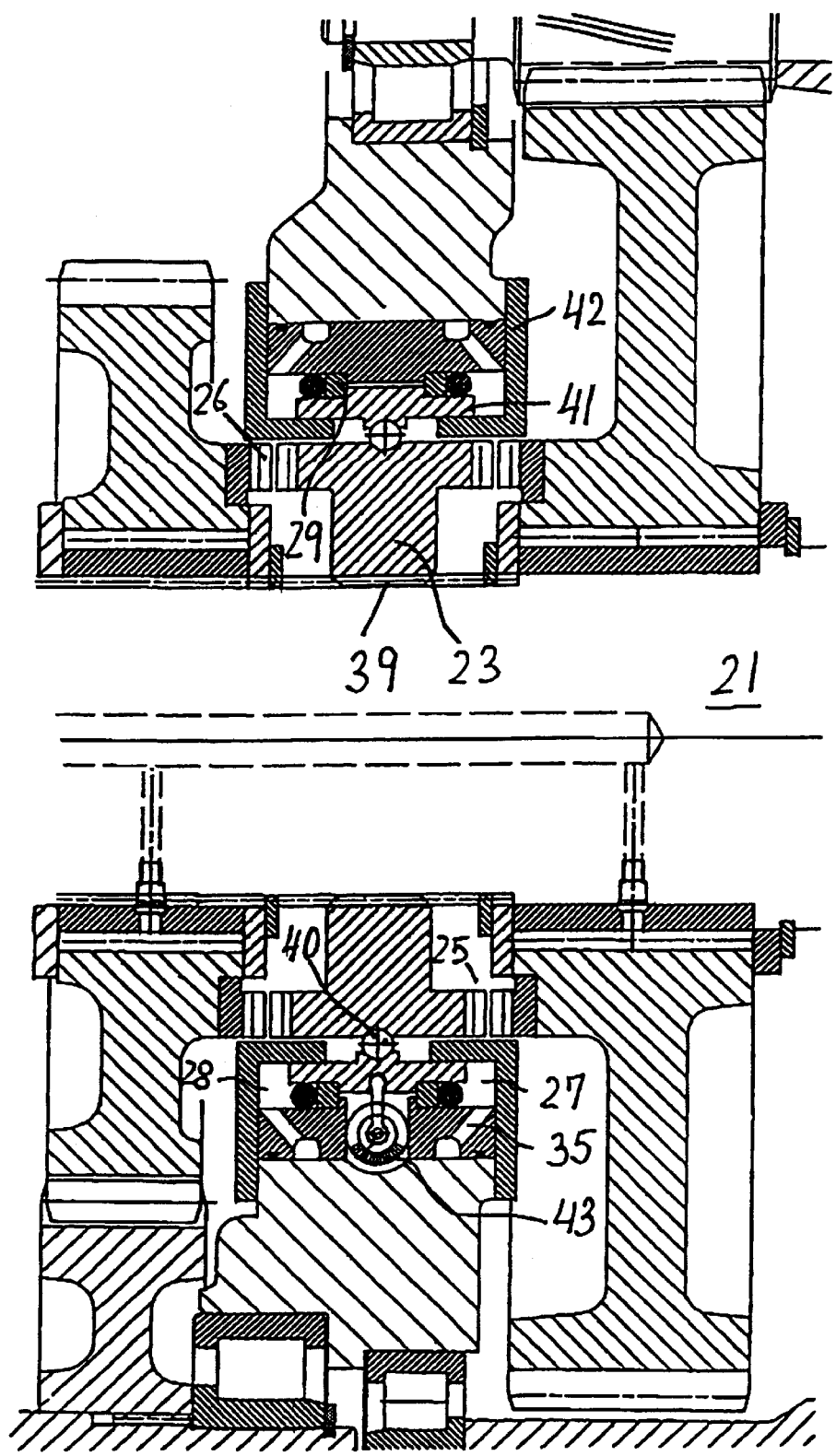

FIG. 6 discloses yet another alternative embodiment of a coaxial double differential clutch. The clutch includes a shift bridge 23 having shift toothing 25, 26 on its axially opposite ends. The shift bridge 23 is operatively connected to the clutch shaft 21 by toothing 39. The toothing 39 permit torque to be transmitted from the shaft 21 to the shift bridge 23 and for axial displacement of the shift bridge 23. The shift bridge 23 is also connected kinematically, by a ball bearing 40 which transmits the required shifting force, to a double piston 41 mounted in a clutch carrier 42 fixed to the casing. The double piston 41 is positioned relative to the fixed casing so that it can be displaced axially between two pressure spaces 27, 28 surrounded by the clutch carrier 42. The pressure in the pressure spaces 27, 28 can be controlled separately from the casing side of the double piston. When subjected to simultaneous pressurization, the pressure spaces 27, 28 hold the double piston 41 in a neutral, central position. Both spaces 27, 28 may also be pressurized to force the piston 41 into the central position. Engagement of one of the two gears $K_1$, $K_3$ or $K_2$, $K_4$ assigned to the shift toothings 25, 26 may be accomplished by depressurizing the pressure space assigned to the other of the two gears.

The double piston 41 is operatively connected to two annular differential pistons 29, which are situated axially opposite one another. Each piston 29 extends toward one of the two pressure spaces 27, 28 and is supported axially against the clutch carrier 42 only when the double piston 41 is in the neutral, central position (shown in FIG. 6). When the double piston 41 is displaced into a shift position of the shift bridge 23, an annular differential piston 29 is displaced by an associated drive feature 30 of the double piston 41 into the associated pressure space 27 or 28. As shown in FIG. 6, the drive feature may include a radially projecting tooth. As is also shown in FIG. 6 the double piston 41 may be coupled or operatively connected to a displacement sensor 43 fixed relative to the casing.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. It is intended that the specification and examples be considered as exemplary only, with a true scope and spirit of the invention being indicated by the following claims.

What is claimed is:

1. A toothed selector clutch in a power shift transmission having an apparatus for a stepless transmission ratio variation, the transmission including downstream gearwheel stages with at least one associated toothed selector clutch thereby providing a plurality of gears, the toothed selector clutch including a coaxial double differential clutch comprising:

a clutch carrier mounted on a rotatable shaft;

a shift bridge operatively connected to the clutch carrier by radial toothing thereby providing for the transmission of torque between the clutch carrier and the shift bridge and for the axial displacement of the shift bridge, the shift bridge being subjected to a pressure medium on axially opposite ends and wherein the shift bridge includes shift toothing on each of the axially opposite ends;

a pair of separately controllable pressure spaces internal to the shift bridge for applying pressure to the opposite ends of the shift bridge, each of the pressure spaces being capable of being subjected to pressure simultaneously to place the shift bridge in a neutral, central position; and wherein each of the pressure spaces is capable of being depressurized individually so that the shift toothing at the end of the shift bridge adjacent the pressurized pressure space engages an adjacent gear at a synchronous speed without transferring load from the shaft to the gear being engaged and without interruption to the transmission of torque from the shaft to an engaged gear designated to be disengaged.

2. The toothed selector clutch of claim 1, wherein the clutch carrier includes a guide portion projecting between the two pressure spaces.

3. The toothed selector clutch of claim 2, further comprising two annular differential pistons which are situated axially opposite one another, wherein each of the differential pistons projects into one of the pair of pressure spaces and is configured to be supported axially against the guide portion of the clutch carrier only when shift bridge is in the neutral, central position so that when the shift bridge is displaced axially away from the neutral position into a shift position, one of the annular differential piston is displaced by a drive feature of the shift bridge into the adjacent pressure space.

4. The toothed selector clutch of claim 3, wherein the drive feature of the shift bridge is radially projecting toothing located internal to the shift bridge.

5. The toothed selector clutch of claim 3, wherein, in the shift position of the shift bridge, the displaced one of the annular differential pistons is configured to rest against an interior axial facing surface of the shift bridge.

6. The toothed selector clutch of claim 4, wherein the clutch carrier includes a hole for guiding lubricating oil to the region of the radial toothing.

7. The toothed selector clutch of claim 3, wherein the shift bridge includes a bleed hole, extending between an internal area between the pair of annular differential pistons and an area external to the shift bridge.

8. The toothed selector clutch of claim 1, wherein the shift bridge includes an annular, radially inward-projecting double piston having an approximately T-shaped cross section and projecting into the interior of the clutch carrier.

9. The tooted selector clutch of claim 8, further comprising a pair of annular differential pistons situated axially opposite one another each of the pistons projecting into one of the two pressure spaces, the pistons being supported axially by the clutch carrier only in a neutral, central position of the shift bridge and being configured so that when the shift bridge is displaced into a shift position, one of the annular differential piston is displaced by an associated drive feature of the shift bridge into the adjacent pressure space.

10. The toothed selector clutch of claim 1 further comprising a pressurized-oil feed for each of the pressure spaces, wherein each of the feeds passes through the shaft and a rotating joint.

11. The toothed selector clutch of claim 10, wherein the pressure of each of the pressure spaces is controlled by a solenoid valve located upstream of the associated rotating joint.

12. A toothed selector clutch in a hydrostatic/mechanical, split-torque power-shift transmission having a four-shaft epicyclic-gearwheel transmission and an infinitely variable hydrostatic transmission arranged in parallel, the transmission including downstream gearwheel stages with associated toothed selector clutches thereby providing a plurality of gears, the hydrostatic transmission providing an infinitely variable transmission ratio for the hydrostatic/mechanical transmission, the toothed selector clutch including a coaxial double differential clutch comprising:

a clutch carrier mounted to a casing;

a shift bridge including shift toothing mounted on each of its axially opposite ends, wherein the shift bridge is connected to a rotatable shaft by radial toothing thereby allowing torque transmission from the shaft to the shift bridge;

a double piston mounted in the clutch carrier, wherein the shift bridge is connected kinematically by a ball bearing to the double piston;

a pair of pressure spaces contained in within the clutch carrier, wherein the double piston is capable of being displaced axially between the pressure spaces;

wherein the pressure within each of the pressure spaces is capable of being controlled separately so that when the two pressure spaces are simultaneously pressurized the double piston is positioned in a neutral, central position; and wherein each of the pressure spaces is capable of being depressurized individually so that when one of the pressure spaces is depressurized the double piston and the shift bridge move axially into a shift position so that the shift toothing at the end of the shift bridge adjacent the other pressurized pressure space engages an adjacent gear at a synchronous speed without transferring load from the shaft to the gear being engaged and without interruption to the transmission of torque from the shaft to an engaged gear designated to be disengaged.

13. The toothed selector clutch of claim 12, wherein the double piston includes two annular differential pistons situated axially opposite one another, each piston having an axial face adjacent one of the two pressure spaces, the differential pistons being supported axially against the clutch carrier only when the double piston is in the neutral, central position the differential pistons being configured so that when the double piston is displaced into the shift position of the shift bridge, one of the annular differential pistons is displaced by an associated drive feature of the double piston into the adjacent pressure space.

14. The toothed selector clutch of claim 13, wherein the double piston is operatively connected to a displacement sensor.

15. A toothed selector clutch in a hydrostatic/mechanical, split-torque power-shift transmission having a four-shaft epicyclic-gearwheel transmission and an infinitely variable hydrostatic transmission arranged in parallel, the transmission including downstream gearwheel stages with associated toothed selector clutches thereby providing a plurality of gears, the hydrostatic transmission providing an infinitely variable transmission ratio for the hydrostatic/mechanical transmission, the toothed selector clutch including a coaxial double differential clutch comprising:

a shift bridge including shift toothing mounted on each of its axially opposite ends, wherein the shift bridge is operatively connected to a rotatable transmission component by radial toothing thereby allowing torque transmission from the rotating component to the shift bridge and axial movement of the shift bridge relative to the rotating component;

a pair of separately controllable pressure spaces, the pressure within each of the pressure spaces capable of being controlled separately so that when the two pressure spaces are simultaneously pressurized the shift bridge is positioned in a neutral, central position; and wherein each of the pressure spaces is capable of being depressurized individually so that when one of the pressure spaces is depressurized the shift bridge moves axially into a shift position so that the shift toothing at one end of the shift bridge engages an adjacent gear at a synchronous speed without transferring load from a rotating clutch shaft to the gear being engaged and without interruption to the transmission of torque from the clutch shaft an engaged gear designated to be disengaged.

16. The toothed selector clutch of claim 15, wherein the rotatable transmission component is the clutch shaft.

17. The toothed selector clutch of claim 15, wherein the rotatble transmission component is a clutch carrier mounted to the clutch shaft.

18. A toothed selector clutch in a hydrostatic/mechanical, split-torque power shift transmission having a four-shaft epicyclic-gearwheel transmission and an infinitely variable hydrostatic transmission arranged in parallel, the transmission including downstream gearwheel stages with associated toothed selector clutches thereby providing a plurality of gears, the hydrostatic transmission providing an infinitely variable transmission ratio for the hydrostatic/mechanical transmission, the toothed selector clutch including a coaxial double differential clutch comprising:

a clutch carrier mounted on a rotatable shaft;

a shift bridge operatively connected to the clutch carrier by radial toothing thereby providing for the transmission of torque between the clutch carrier and the shift bridge and for the axial displacement of the shift bridge, the shift bridge being subjected to a pressure medium on axially opposite ends and wherein the shift bridge includes shift toothing on each of the axially opposite ends;

a pair of separately controllable pressure spaces internal to the shift bridge for applying pressure to the opposite ends of the shift bridge, each of the pressure spaces being capable of being subjected to pressure simultaneously to place the shift bridge in a neutral, central position; and wherein each of the pressure spaces is capable of being depressurized individually so that the shift toothing at the end of the shift bridge adjacent the pressurized pressure space engages an adjacent gear at a synchronous speed without transferring load from the shaft to the gear being engaged and without interruption to the transmission of torque from the shaft to an engaged gear designated to be disengaged.

19. A hydrostatic/mechanical, split-torque power shift transmission comprising:

a first transmission, wherein the first transmission is a four-shaft epicyclic-gearwheel transmission;

a second transmission, wherein the second transmission is an infinitely variable hydrostatic transmission and the first and second transmissions are arranged in parallel, the second transmission providing an infinitely variable transmission ratio for the hydrostatic/mechanical transmission;

a plurality of downstream gearwheel stages providing a plurality of gears, each stage including a toothed selector clutch comprising:
  a coaxial double differential clutch comprising:
a shift bridge including shift toothing mounted on each of its axially opposite ends, wherein the shift bridge is operatively connected to a rotatable transmission component by radial toothing thereby allowing torque transmission from the rotating component to the shift bridge and axial movement of the shift bridge relative to the rotating component;

a pair of separately controllable pressure spaces, the pressure within each of the pressure spaces capable of being controlled separately so that when the two pressure spaces are simultaneously pressurized the shift bridge is positioned in a neutral, central position; and wherein each of the pressure spaces is capable of being depressurized individually so that when one of the pressure spaces is depressurized the shift bridge moves axially into a shift position so that the shift toothing at one end of the shift bridge engages an adjacent gear at a synchronous speed without transferring load from a rotating clutch shaft to the gear being engaged and without interruption to the transmission of torque from the clutch shaft an engaged gear designated to be disengaged.

* * * * *